(12) United States Patent
Schneider

(10) Patent No.: US 6,206,163 B1
(45) Date of Patent: Mar. 27, 2001

(54) FLOW CONTROL CAPSULE FOR CLUTCH LUBRICATION AND COOLING

(75) Inventor: Karl F. Schneider, Clarkston, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/438,327

(22) Filed: Nov. 13, 1999

(51) Int. Cl.[7] .................................................. F16D 13/60
(52) U.S. Cl. .............................. 192/113.35; 192/113.3; 192/70.12
(58) Field of Search ..................... 192/70.12, 113.3, 192/113.34, 113.35

(56) References Cited

U.S. PATENT DOCUMENTS

| | | | |
|---|---|---|---|
| 2,642,844 | * | 6/1953 | Flinn ........................................ 91/422 |
| 3,647,037 | * | 3/1972 | Toma ................................. 192/106 F |
| 3,677,381 | * | 7/1972 | Takagi et al. ..................... 192/106 F |
| 4,270,647 | * | 6/1981 | Leber ................................. 192/113 B |
| 4,442,929 | * | 4/1984 | Uchida ..................................... 192/52 |
| 5,469,943 | * | 11/1995 | Hill et al. .................... 192/113.53 X |
| 5,495,927 | * | 3/1996 | Samie et al. ....................... 192/70.12 |
| 6,098,771 | * | 8/2000 | Vu ..................................... 192/70.12 |

\* cited by examiner

*Primary Examiner*—Charles A Marmor
*Assistant Examiner*—Saúl Rodríguez
(74) *Attorney, Agent, or Firm*—Reising, Ethington, Barnes, Kisselle et al; Greg Dziegielewski

(57) ABSTRACT

A friction device includes a clutch pack operable to connect and disconnect drive and driven members for transferring and interrupting torque therebetween. A piston is supported in the clutch housing and defines a first expandable chamber. The piston carries a control module responsive to pressure in the expandable chamber for controlling coolant flow through a dedicated coolant flow passage through the actuator piston that includes mist-forming outlets on the face of the actuator piston.

10 Claims, 2 Drawing Sheets

FLOW CONTROL CAPSULE FOR CLUTCH LUBRICATION AND COOLING

FIELD THE INVENTION

The present invention relates, generally, to friction devices such as clutch or brake assemblies for use in transmissions, differentials or brake systems. More specifically, the present invention relate to a multi-disk friction clutch or brake system having selectively actuated lubrication for cooling the friction device on demand.

DESCRIPTION OF THE RELATED ART

Multi-disk friction devices are employed in a wide range of applications as clutches or brakes. For example, such friction devices are frequently used in landbased vehicles. Generally speaking, land vehicles require three basic components. These components include a power plant (such as an internal combustion engine), a powertrain and wheels. The powertrain's main component is typically referred to as the "transmission." Engine torque and speed are converted in the transmission in accordance with the tractive-power demand of the vehicle. Transmissions include one or more gear sets, which may include an inner sun gear, intermediate planet gears that are supported by their carriers and outer ring gears. Other examples are transmissions that include lay shaft external gears and continuously variable transmissions having starting clutches for forward and reverse drives. Other examples are continuously variable traction type transmissions where range control clutches are used for low and overdrive. Various components of such transmissions are held or powered to change the gear ratios in the transmission. The multi-disk pack clutch is a friction device, which is commonly employed as a holding mechanism in a transmission or differential. In addition, multi-disk friction devices also find use in industrial applications, such as wet brakes, for example, to brake the wheels on earth moving equipment.

The multi-disk pack clutch or brake assembly has a clutch sub-assembly including a set of plates and a set of friction disks, which are interleaved between one another (also including single sided plates with a friction surface and a metallic surface). The plates and friction disks are bathed in a continual flow of lubricant and in "open pack" operation normally turn past one another without contact. The clutch or brake assembly also typically includes a piston. When a component of a gear set is to be held, as for example during a particular gear range, a piston is actuated so as to cause the plates and friction disks to come in contact with respect to one another. In certain applications, it is known to employ several multi-disk pack friction devices in combination to establish different drive connections throughout the transmission or differential to provide various gear ratios in operation, or to brake a component.

The confronting faces of the interleaved plates and friction disks are covered with frictional surfaces. When a friction device is engaged, kinetic energy is converted into thermal energy and a considerable amount of heat is generated. If the frictional surfaces get too hot, they can burn which damages the friction surfaces, oxidizes the lubricant and degrades the clutch or brake operational effectiveness. Therefore, the heat generated when a friction device is engaged must be dissipated.

Multi-disk friction clutches and brake systems have traditionally relied on a continuous "splash" supply of coolant, typically automatic transmission fluid (AFT) or traction fluid, to remove the heat generated during operation. Coolant is supplied at or near the inner diameter of the disks and moves radially outward across the friction surface under the influence of centrifugal forces. While the centrifugal forces are important to move the coolant between the engaging friction disks, because the perimeter of the plates is larger at the outer diameter than the inner diameter, the coolant tends to break up into droplets which reduces wetting of the friction surfaces and concomitantly reduces the cooling capacity of the fluid.

When the disks are not engaged, little or no cooling is usually required. However, with conventional cooling schemes employed in the related art, unneeded coolant is often supplied to the open clutch or brake. When this occurs, the coolant in the friction device is sheared by the interleaved plates and friction disks due to the differential rotational speeds of the drive and driven members which the clutch or brake bridges. This condition reduces the efficiency of the transmission through viscous shear losses in the clutch or brake cooling fluid and ultimately results in lower fuel efficiency.

Additionally, when coolant is directed toward a friction device operating in an open pack mode wherein coolant is not needed, the coolant is not being used by friction devices, which are engaged or otherwise require cooling. This also increases the volume of oil used by for a given transmission, differential or brake system and unnecessarily requires increasing the capacity of the associated pump.

It is known in the related art to selectively provide coolant to the clutch pack when the friction device is being engaged and to selectively interrupt coolant to the clutch pack when the friction device is engaged or disengaged. However, in general, the systems that have been proposed in the related art suffer from the disadvantage that they are overly complex in operation or are too difficult to be manufactured in a cost-effective manner. Examples of such arrangements are set-forth in U.S. Pat. Nos. 5,755,314; 5,791,447; and 5,813,508.

Accordingly, there remains a need in the art for a friction device which may be selectively cooled on demand using forced coolant flow such as when the clutch or brake is engaging and wherein coolant to the clutch or brake may be selectively interrupted when not needed, such as when the clutch or brake is disengaged. Additionally, there is a need in the art for such a friction device having a cooling scheme wherein the friction disk are fully wetted when they are engaging.

In copending United States application Ser. No. 09/153, 582, commonly assigned, a multi-disc friction device is interposed between the drive and driven members and is operable to connect and disconnect the drive and driven members for transferring and interrupting torque therebetween. A piston assembly is supported in housing and defines an expandable chamber between the piston assembly and the housing. A source of pressurized fluid is in communication with the expandable chamber. The piston assembly is responsive to the pressure of fluid in the expandable chamber to move between disengaged and engaged positions thereby actuating the multi-disc friction device to connect and disconnect the drive and driven members.

The piston assembly includes a main body having an outer ring annularly disposed about the main body. The outer ring includes at least one orifice extending through the outer ring. The outer ring is movable between a first position wherein the orifice is closed and the drive and driven members are disconnected and a second position wherein the orifice is open to allow flow of pressurized fluid through the orifice and into contact with the clutch pack thereby cooling the multi-disc friction device when the drive and driven members are operatively connected through the multi-disc friction device.

Thus, the piston assembly is operable to control the flow of coolant under pressure from the outer diameter of the friction device between the adjacent plates and disks to the inner diameter of the friction device to cool it when the drive and driven members are connected. Further, the piston assembly is also operable to stop the flow of pressurized coolant and to evacuate the friction device when the drive and driven members are disconnected.

In this way, the friction device provides coolant to the clutch pack when coolant is needed, such as when the clutch or brake is engaging, and interrupts coolant to the clutch pack when the coolant is not needed, such as when the clutch or brake is disengaged. However, such an arrangement utilizes the piston apply fluid as the coolant fluid.

SUMMARY OF THE INVENTION

In order to isolate the piston apply function from the cooling function a separate supply of pressurized fluid is directed through a coolant supply line and coolant control is by piston actuation pressure to control flow from the coolant supply line to a multi-disc friction device.

A feature of the present invention is to provide for such control by the provision of a control module that can be disposed within a wide range of actuator pistons for operating brakes or clutches.

A further feature of the present invention is to provide such a module that is configured as a thread mounted capsule.

A still further feature of the present invention is to provide such a module with a pressure responsive control element for opening and closing a separate dedicated coolant path through the piston for supplying coolant to a clutch or brake pack.

A still further object of the present invention is to provide a pressure connection between the pressure responsive control element and an expandable chamber that connects to a pressure source for operating the actuator piston for a clutch of brake pack.

A still further feature is to provide such an arrangement wherein such pressure connection is through a piston connector on the module.

A still further feature of the invention is to provide the connector as a threaded end segment of the module.

A still further feature is to provide the control element as a spring-biased piston that has a land thereon for opening and closing the dedicated coolant path through the piston.

Yet another feature of the invention is to provide a plurality of coolant flow outlets the shape of which can provide a misty or full body flow pattern type cooling flow or any variant between on the outboard face of the actuator piston and wherein coolant from the dedicated coolant path flows through the coolant flow outlets during actuation of a brake or clutch pack as a mist for cooling such packs.

Still another feature of the present invention is to provide a spring biased force on the control element such that the module acts as an accumulator for the buildup of piston actuation pressure prior to distribution of coolant from the dedicated coolant source.

Yet another feature of the present invention is to provide such an accumulator effect within the module by a second piston responsive to the piston actuation pressure and to compensate for variations in the piston actuation pressure.

The advantages of such an arrangement is that actuation pressure for the clutch pack can be separated from coolant flow in a multi-disc friction device such as multidisc clutch or brake packs thereby optimizing the control of friction device operations.

BRIEF DESCRIPTION OF THE DRAWINGS

Other advantages of the invention will be readily appreciated, as the same becomes better understood by reference to the following detailed description when considered in connection with the accompanying drawings, wherein.

DETAILED DESCRIPTION OF A PREFERRED EMBODIMENT

Figure 1:
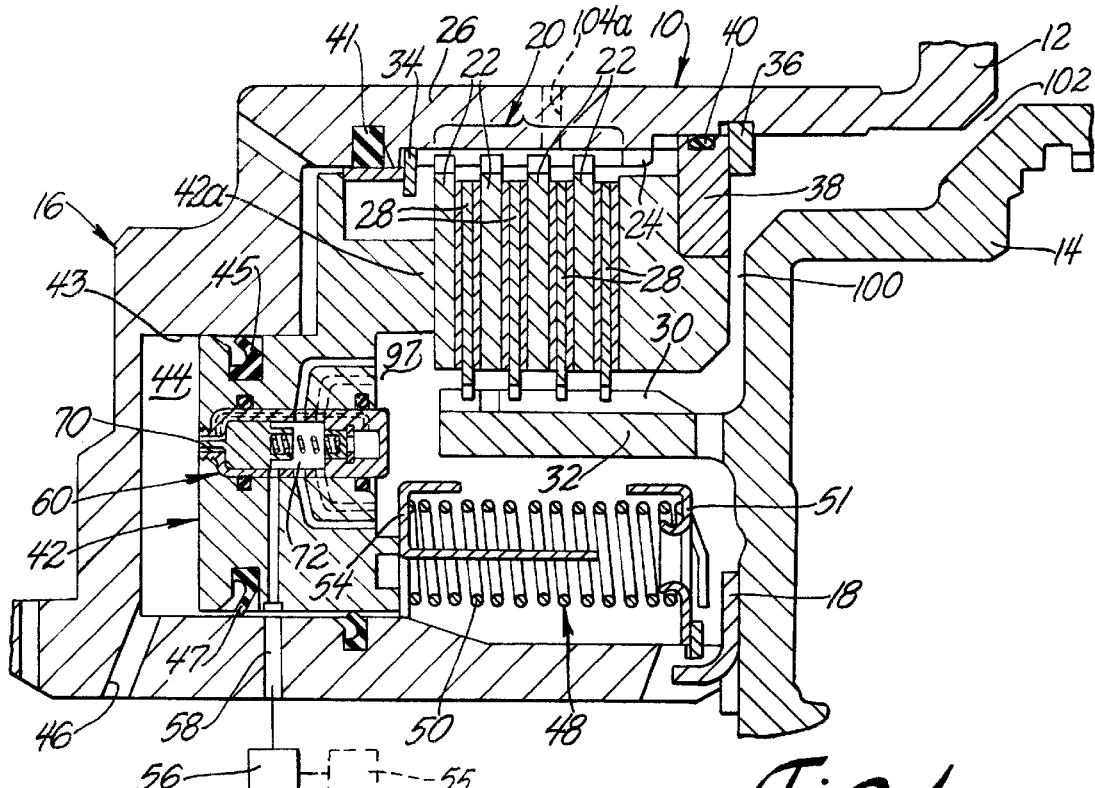
FIG. 1 is a partial cross-sectional side view illustrating the friction device of the present invention operating in an engaged mode.

Referring now to FIG. 1, a multi-disc friction device such as a clutch or brake assembly of the present invention is generally indicated at 10. The friction device 10 is adapted to be employed in connection with a transmission, differential or brake system. For example only and not by way of limitation, as is commonly known in the art, but not shown in these figures, transmission assemblies typically include an input shaft which is operatively coupled to a prime mover, such as an internal combustion engine. In an automotive application, the transmission assembly also includes an output shaft, which is operatively coupled to driven wheels through other drivetrain components such as a drive shaft and an axle having a differential. At least one, and often a plurality of, gear sets is operatively coupled between the input and output shafts. The transmission casing supports the input shaft, the output shaft and the gear sets of the transmission assembly.

Various components of the gear sets are held or powered to change the gear ratio in the transmission. To this end, the transmission assembly will typically include at least one friction device 10. However, it will be appreciated by those having ordinary skill in the art that the transmission assembly may employ any number of friction devices adapted to hold or power gear sets to change the gear ratio of the transmission. Further, and notwithstanding the automotive related context of the discussion above, from the description that follows, those having ordinary skill in the art will appreciate that the present invention may be employed in a transmission, differential or brake system whether used in an automotive, non-automotive or industrial application. Thus, to the extent the term "clutch" is used below in any context, this term should be given its broadest possible meaning including, but not limited to, clutches and brakes for use in transmissions, differential or braking systems of all types.

The friction device 10 includes a drive member, generally indicated at 12 and a driven member, generally indicated at 14 both of which are rotatable about a common axis and which define a clutch housing, generally indicated at 16. A thrust bearing 18 is interposed between the drive and driven members 12, 14, respectively, to support axial loads which can stack up among various components in the transmission.

An annular clutch pack, one half of which is generally indicated by the bracket labeled at 20, is interposed between the drive 12 and driven 14 members and operates to connect and disconnect the drive 12 and driven 14 members for translating and interrupting torque therebetween. The clutch pack 20 includes a plurality of annular plates 22 connected by splines at 24 to a housing segment 26. Annular friction disks 28 are splined at 30 to the driven hub 32 and are interleaved between the plates 22. Together, the plates 22 and disks 28 of the annular clutch pack 20 define an outer diameter roughly at the splines 24 of the housing segment 26 and an inner diameter roughly at the splines 30 of the driven hub 32. In one disposition shown in FIG. 1, the plates 22 and friction disks 28 rotate past one another in non-contacting relationship. The plates 22 and friction disks 28 are also axially movable relative to their respective housing segment 26 and hub 32 to come into frictional engagement, thereby reducing or eliminating relative rotation between the plates 22 and disks 28. A pair of retaining rings 34, 36 are mounted to the housing segment 26 and are disposed on either side of the clutch pack 20. A pressure plate 38 with an O-ring gland 40 also cooperates with the retaining ring 36 to limit axial movement of the plate's 22 and friction disks 28. When the disks and plates are engaged, the clutch pack 20 is sealed at its outer diameter by O-ring gland 40 and O-ring seal 41 in a housing segment 26. In other embodiments to be described such seals are not required.

The axial movement of the plates 22 and discs 28 is achieved through the actuation of an annular piston assembly, generally indicated at 42, which is supported in an annular bore 43 in the clutch housing 16. The bore 43 is sealed by annular piston seals 45, 47.

The piston assembly 42 and the clutch housing 16 cooperate to define an expandable chamber 44 between the piston assembly 42 and the clutch housing 16. A source of pressurized actuation or piston apply fluid is in communication with the expandable chamber via pressure port 46. The piston assembly 42 is responsive to the pressure of fluid in the expandable chamber 44 to move between disengaged and engaged positions thereby actuating the clutch pack 20 to connect and disconnect drive and driven members 12, 14.

A biasing member, generally indicated at 48, may be employed to move the piston assembly 42 to its disengaged position. This biasing member 48 is supported in the clutch housing 16. As illustrated in FIG. 1, the biasing member is a return spring assembly 48 that can have one or more coiled springs. One coil spring 50 is shown captured within a retainer 51 with one end 52 of the spring 50 biased against a retainer wall 54 held by the spring 50 against the piston assembly 42. It will be appreciated by those having ordinary skill in the art that the roles of the expandable chamber 44 and biasing member 48 may be reversed such that the biasing member 48 is employed to engage the clutch pack 20. Further, it will also be appreciated that the biasing member 48 may include any biasing mechanism conventionally known in the art and is not limited to a coiled spring.

As alluded to above, just before the clutch pack 20 is engaged by movement of a piston flange 42a against the inboard most plates 22, the plates 22 and disks 28 come into frictional contact with one another until the relative rotational speed between the plates 22 and disks 28 becomes zero. In this disposition, the plates 22 and disks 28 are either rotating together at one speed or are both held against rotation, depending on the particular application in a transmission, differential or brake system. In any case, during the engagement of the plates 22 and disks 28, kinetic energy is converted to thermal energy and a considerable amount of heat is generated. This heat must be dissipated.

Figure 3:
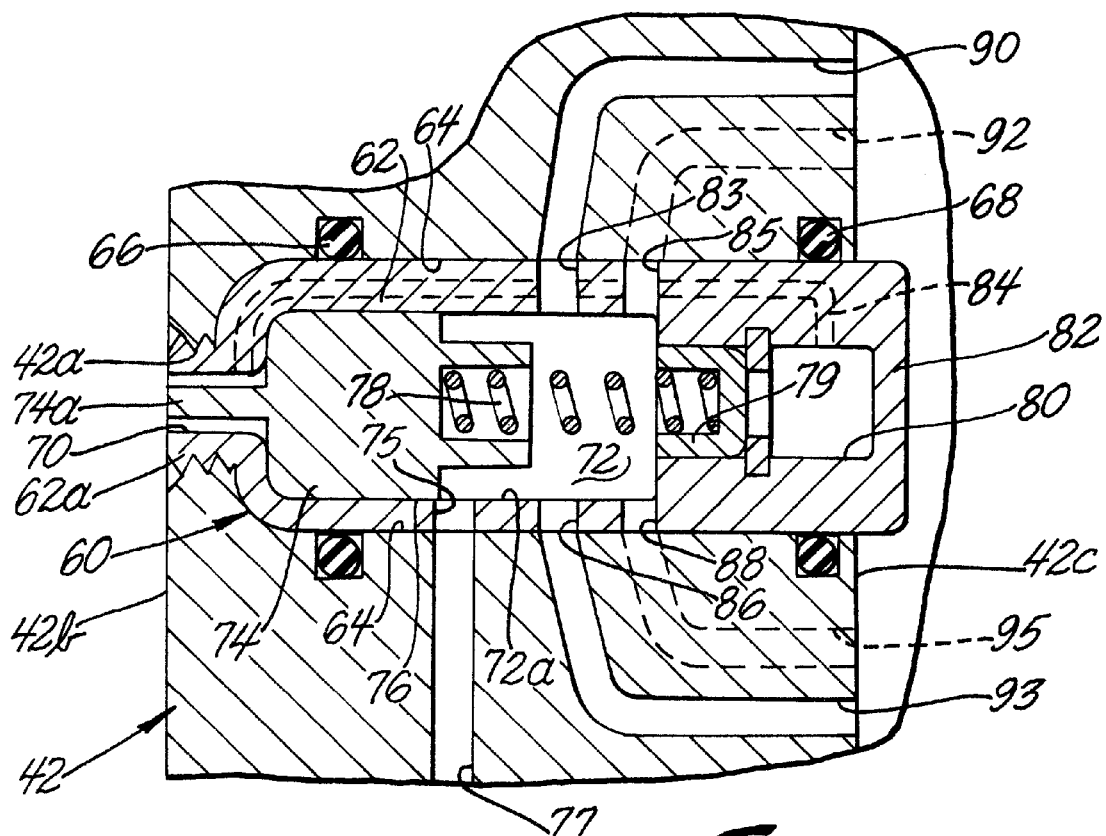
FIG. 3 is a enlarged partial cross-sectional view of an actuator piston carrying a control module according to the invention.

To this end, a second dedicated source of lubricant 56 is provided connected to a port 58 in the clutch housing 16. The second source 56 is under the control of a control module or capsule 60 constructed according to the present invention. More particularly, as best shown in FIG. 3, the capsule 60 includes an outer housing wall 62 that is seated within a bore 64 in the piston 42 having the opposite ends closed by seals 66, 68 interposed between the housing 62 and the wall of the bore 64. The outer housing wall 62 is connected within the bore 64 by an exteriorly threaded tip portion or end segment 62a that is threaded into a tapped bore 42a in the inboard end 42b of the piston 42. While a threaded connection is shown it will be understood that any suitable fastener can be employed for holding the capsule 60 in its operative position.

The threaded tip portion 62a has a central passage 70 there through that communicates with the expandable chamber 44 and with an interior cavity 72 within the module 60. The interior cavity 72 is an expandable chamber defining an annular bore wall 72a that supports a piston control element 74 for sliding movement within the cavity 72. The piston control element 74 has a guide 74a thereon that slide within the central passage 70 for centering the control element 74 within the cavity 72. A stepped land 76 on the control element 74 is arranged to normally close a port 75 communicating with a piston passage 77 when the clutch pack 20 is disengaged. As a consequence, the separator plates 22 and the friction discs 28 are free to rotate without viscous drag there are between.

The feed of cooling lubricant to the module is controlled by a central control 55 when the clutch is released. At such time coolant is not required and the central control 55 can be configured to limit coolant flow to each of one or more such modules to limit the coolant flow volume to that required only when one or more of the clutches are actuated thus requiring cooling at such one or more of the clutches while they are engaging.

Figure 4:
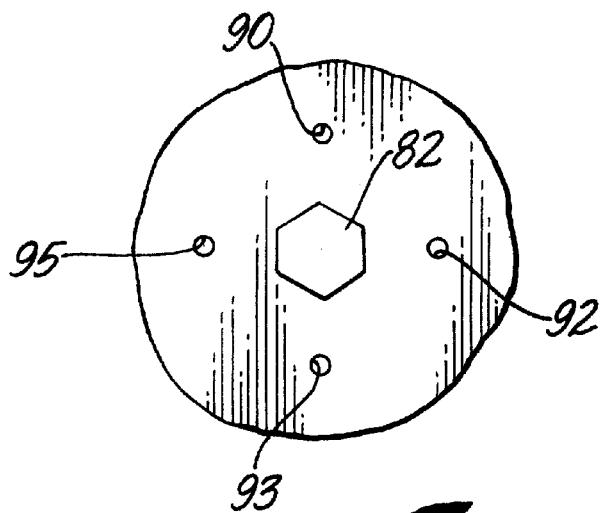
FIG. 4 is an end elevation view looking in the direction of the arrow 4 in FIG. 3.

The piston control element 74 is biased into the closed position by a control spring 78 that has one end biased there against and that has the opposite end thereof biased against a pressure compensating piston 79 located within a bore 80 formed within a closed end 82 of the module 60. As best shown in FIGS. 3 and 4 the piston 79 has a smaller diameter than that of the piston control element 74. Clutch actuation pressure from the expandable chamber 44 is connected to the bore 80 via a passage 84 to act on piston 79 for compensating pressure variances in the actuation pressure acting on control element 74. In the illustrated embodiment the module the module 60 is a cast housing and the passage 84 for pressure compensation can be cast directly in the outer wall 62 of the module 60. Hence the piston 79 and pressure acting thereon applies a fluid pressure on said first control element in addition to the pressure of said biasing spring for modulating the action of said control element relative to the clutch pressure as it varies in accordance with engine torque.

By virtue of the aforesaid arrangement, the spring 78 and pressure compensating piston 79 combine to define a control pressure on the piston control element 74 to maintain the dedicated cooling source 56 closed until there is a sufficient pressure buildup within the expandable chamber 44 to overcome the force of the spring 78 and pressure acting on the reduced area of the piston 79.

An aspect of the present invention is that such combined biasing of the piston control element 74 takes the place of known accumulators that are provided in known lubricant supply where the coolant and actuation pressure are the same source. In such cases, the ports 46, 58 can be connected to the clutch apply pressure and it is advantageous to prevent clutch actuation until the pressure within the system is adequate to produce desired braking. The provision of the spring control in such case provides for an accumulator action within the confines of the module 60 and eliminates the need for a separate apply pressure accumulator.

Another feature of the present invention is that the outer wall 62 of the module 60 can have a wide variety of coolant outlets 83, 85, 86, 88 that are communicated with the interior cavity 72 in the module 60 defined between the pistons 74, and 79. The coolant outlets 83–88 communicate respectively with passages 90, 92, 93, 95 formed through the body of the piston 42. As shown in FIG. 4, each of the passages 90,92,93,95 are direct through the face 42a of the piston 42 so that coolant passes into a chamber 97 of the friction device 10. The coolant flow will be a spray pattern that can be comprised of fluid streams, droplets or a fine mist depending upon the shape of the outlets from each of the passages 90–95. Such coolant flow occurs when the piston 42 is actuated and the pressure in the expandable chamber 44 overcomes the accumulator action within the module 60. The combined action of the control spring 78 and the pressure compensating piston 79 will bias the piston control element 74 to the left as shown in FIG. 1 causing the land 76 to clear port 75 and open passage 77.

The dedicated source of coolant 56 flows through passages 58, 77 to thereby fill the outer diameter to the inner diameter of the clutch pack 20 between seals 40, 41 and is totally isolated from the piston actuation fluid. As a consequence, when coolant is required it flows without adversely affecting actuation pressure because of the accumulator affect in the module 60.

More specifically, the pressurized coolant fluid flows from the housing segment 26 across the plate's 22 and friction disks 28 against any centrifugal forces acting through the clutch pack 20 to the driven hub 32. Each of the plates 22 and friction disks 28 may include grooves to facilitate cooling of the frictional surfaces. However, the flow of coolant under pressure from the outer diameter to the inner diameter of the clutch pack ensures full wetting of the frictional surfaces and this improves the cooling efficiency of the clutch. Movement of the coolant against the direction of common centrifugal forces also ensures that the coolant will not degrade into droplets or otherwise atomize in the clutch pack 20. The pressurized fluid, typically ATF, thus cools the clutch pack 20 when the drive and driven members are operatively connected. Excess fluid may exit the clutch housing 16 via opening 100 adjacent pressure plate 40 and flows out drain 102 to an ATF sump (not shown).

Figure 2:
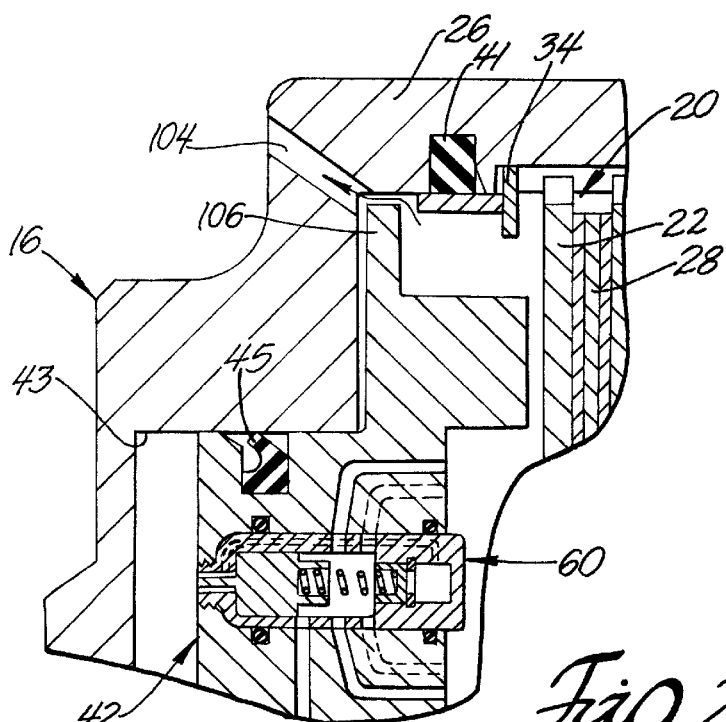
FIG. 2 is a partial cross-sectional side view of the friction device shown in FIG. 1 wherein the clutch or brake is in an open pack inside.

The friction assembly 10 also includes at least one, but preferably a plurality of exhaust ports 104 formed in the clutch housing 16, in this case the housing segment 26. An outer ring 106 is movable to open the exhaust port 104 to direct centrifugal pressurized fluid away from the clutch pack 20 when the drive and driven members 12, 14 are disconnected (FIG. 2). In addition, the outer ring 106 is movable to close the exhaust port 104 when the drive and driven members 12, 14 are connected (FIG. 1). Thus, when the clutch pack 20 is open or engaged and relatively little heat is generated, the exhaust port 104 is open, no fluid flows through the module 60 and any fluid in the housing 16 is directed through the exhaust port(s) 104 so as to eliminate or substantially reduce any viscous drag between the discs and friction plates. However, when the clutch pack 20 is engaging, the exhaust port 104 is closed.

While a radial out to in pattern of coolant flow is illustrated it should be understood that ID to OD coolant flow is also contemplate. In such cases, the coolant is supplied to hub 32 and flows radially outwardly through the clutch pack 22 and thence through openings shown in broken lines 104a in the housing segment 26.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A friction device having a drive member and a driven member which are rotatable about a common axis and which define a clutch housing therebetween; a clutch pack interposed between said drive and driven members and operable to connect and disconnect said drive and driven members for transferring and interrupting torque there between; a piston assembly supported in said clutch housing and defining a first expandable chamber between said piston assembly and said clutch housing; a first source of pressurized fluid in communication with said first expandable chamber, said piston assembly being responsive to the pressure of fluid in said expandable chamber to move between disengaged and engaged positions thereby actuating said clutch pack to connect and disconnect said drive and driven members; characterized by:

control module supported in said piston; a second source of pressurized lubricant; said control module including a control element having a surface thereon directly exposed to pressure in said expandable chamber and responsive to the pressure in said expandable chamber for controlling flow from said second source of pressurized fluid into said module; and outlets in said control module for directing the second source of pressurized fluid to said clutch pack when actuated by said piston.

2. A friction device according to claim 1 further characterized by said module being fixed to said piston.

3. A friction device according to claim 1 further characterized by a separate dedicated coolant flow passage through said piston and said control element operative in response to pressure in said expandable chamber for opening and closing said coolant flow passage for supplying coolant to said clutch when it is initially engaged.

4. A friction device according to claim 1 further characterized by said control module having an inlet port on one end thereof providing a pressure connection between said control element and said expandable chamber.

5. A friction device according to claim 4 further characterized by further characterized by said module having a connector thereon for securing said module within said piston and wherein said inlet port is formed through said connector.

6. A friction device according to claim 5 further characterized by said connector configured as a threaded tip on said module.

7. A friction device according to claim 1 further characterized by said piston having a dedicated coolant passage therein; said control element configured as a spring biased piston having a land thereon for opening and closing said dedicated coolant passage.

8. A friction device according to claim 1 further characterized by said actuator piston having a plurality of dedicated coolant passages therethrough including an inlet passage and a plurality of outlet passages each providing coolant flow from said actuator piston and wherein lubricant flows therefrom during actuation of said clutch pack for providing a flow of coolant across said clutch pack.

9. A friction device according to claim 1 further characterized by said control element having a biasing spring acting thereon for providing an accumulator action within said module for the buildup of piston actuation pressure.

10. A friction device according to claim 9 further characterized by a second control element within said module for applying a fluid pressure on said first control element in addition to the pressure of said biasing spring for modulating the action of said control clement relative to the clutch pressure as it varies in accordance with engine torque.

* * * * *